No. 687,321. Patented Nov. 26, 1901.
C. H. KUHN.
FLUID PRESSURE SPEED GOVERNOR FOR ENGINES.
(Application filed Feb. 20, 1901.)
(No Model.) 4 Sheets—Sheet 1.

Witnesses
J. M. Fowler Jr.
Wm. C. Deane

Inventor
Charles H. Kuhn,
By
D. T. Wolhaupter,
Attorney

No. 687,321. Patented Nov. 26, 1901.
C. H. KUHN.
FLUID PRESSURE SPEED GOVERNOR FOR ENGINES.
(Application filed Feb. 20, 1901.)
(No Model.) 4 Sheets—Sheet 3.

Fig. 3.

Witnesses
J. M. Fowler Jr.
Wm. W. Beard

Inventor
Charles H. Kuhn,
By
D. P. Holhaupter
Attorney

No. 687,321. Patented Nov. 26, 1901.
C. H. KUHN.
FLUID PRESSURE SPEED GOVERNOR FOR ENGINES.
(Application filed Feb. 20, 1901.)
(No Model.) 4 Sheets—Sheet 4.

Witnesses
J. M. Fowler Jr.
Wm. W. Deane

Inventor
Charles H. Kuhn,
By
Attorney

UNITED STATES PATENT OFFICE.

CHARLES H. KUHN, OF WASHINGTON, PENNSYLVANIA, ASSIGNOR OF THREE-FOURTHS TO WILLIAM C. BALDWIN, JOHN H. MURDOCH, AND ALVAN DONNAN, OF WASHINGTON, PENNSYLVANIA.

FLUID-PRESSURE SPEED-GOVERNOR FOR ENGINES.

SPECIFICATION forming part of Letters Patent No. 687,321, dated November 26, 1901.

Application filed February 20, 1901. Serial No. 48,147. (No model.)

*To all whom it may concern:*

Be it known that I, CHARLES H. KUHN, a citizen of the United States, residing at Washington, in the county of Washington and State of Pennsylvania, have invented certain new and useful Improvements in Fluid-Pressure Speed-Governors for Engines; and I do hereby declare the following to be a full, clear, and exact description of the invention, such as will enable others skilled in the art to which it appertains to make and use the same.

This invention relates to engines or motors and has special reference to the governing mechanism therefor.

To this end the invention comtemplates an improved automatic speed-governor for engines and other motors comprising means for effecting an automatic governing or regulation of the speed to any desired degree which may have been predetermined, according to the work the engine or motor is to perform.

The invention has in view the provision of a governor or governing mechanism adapted to every type of stationary or portable engine, the same in its preferred aspect being in the form of an attachment which may be readily fitted to any engine without any substantial change in the construction or working parts thereof.

Another object of the invention is to provide a governor or governing mechanism for engines which will involve a minimum number of working parts, while at the same time being extremely sensitive to changes of speed and comprising means for instantly varying the position of the governor-valve to give the proper steam-opening and quickly control the engine for such relative speed. In other words, the invention contemplates a governor or governing mechanism whereby the closest possible regulation can automatically be obtained for any style of engine or motor in connection with which a throttling-governor can be used.

A further object of the invention is to provide an automatic speed-governor for engines which shall entirely take the place of the centrifugal or ball governors which are now and have been for years commonly employed for effecting an ordinary automatic regulation of the speed of an engine. In the ordinary governors of that type springs, gearing, and other working machine elements are necessarily employed in the construction thereof and often require adjustment or repair, besides frequently causing such a friction as to seriously interfere with the sensitiveness of the governor. The present invention entirely obviates these objections to the common types of centrifugal or ball governors and provides a construction in which there is a complete absence of springs, gears, or other elements involving more or less friction in their use, besides being subjected to other influences which sometimes interfere with the action of the governor.

In the accomplishment of these objects the invention contemplates a governor or governing mechanism controllable through the medium of fluid-pressure supplied through the action of the engine or motor equipped with the attachment.

The invention also has in view a fluid-pressure-controlled governor or governing mechanism equipped with simple means for quickly and instantly setting the governor to control the engine at any predetermined speed.

Another object is to associate with the governing mechanism improved means for automatically counteracting or resisting the action of the air or other fluid under pressure to effect the proper automatic governing or regulation of the valve and also to equip the mechanism with a device for setting and locking the parts of the mechanism in position ready for operation when the flow of steam or other motive agent is turned on through the main throttle.

The invention also contemplates a construction with which may be conveniently associated a sawyer's connection or lever to be utilized for the quick return of the log-carriage in sawmills.

With these and many other objects in view, which will more readily appear as the nature of the invention is better understood, the same consists in the novel construction, combination, and relation of parts hereinafter more fully described, illustrated, and claimed.

The essential features of the invention involved in the fluid-pressure-controlling and fluid-pressure-supplying devices are necessarily susceptible to a variety of modifications and to embodiment in different forms, but for illustrative purposes the preferred embodiments of the governor attachment are shown in the accompanying drawings, in which—

Like numerals of reference designate corresponding parts in the several figures of the drawings.

In carrying out the present invention the fluid-pressure-controlled governing mechanism may obviously be associated with any suitable type of throttling governor-valve which under the influence of the mechanism would give the proper steam-opening to effect a regulation in the speed of the engine; but in order to provide a governor which shall be exceedingly sensitive to the speed influences of the engine or motor it has been found important to the successful operation of the governing mechanism that a valve of the balanced type be employed, so that the pressure of the steam or other motive agent upon the valve will not affect the sensitiveness of the governor mechanism proper in the slightest degree, besides permitting the valve to respond instantly to the movement of the fluid-pressure controlling mechanism in either direction. Hence for the purpose of showing the invention in one of its most practical aspects a special form of steam-balanced valve is shown in the drawings as constituting a part of the governing mechanism. This valve is designated in its entirety by the numeral 1 and is employed in connection with a governor-valve casing or chamber 2, which is of such a form as to conveniently carry the entire governing mechanism, exclusive of the pressure-supply device or pump, and may be readily attached on top of the steam-chest 3 of an engine 4 or other motor. The engine or motor 4 shown in the drawings is an ordinary type of direct-acting engine and includes in its organism the usual steam-chest 3, the cylinder 5, the piston-rod 6, and the cross-head 7, having the usual connecting-rod connection 8 with the crank of the drive-shaft 9. Of course any form of engine may be equipped with the governor; but the parts referred to have been specified in order that a comprehensive understanding may be had of a practical way of applying the invention for use.

The governor-valve casing or chamber 2 is preferably constructed as shown in the drawings and is provided at the lower side thereof with an outturned base-flange 10, which is bolted or otherwise suitably fastened to the steam-chest 3, directly over the steam-inlet port 11 thereof, whereby the steam or other motive agent may pass directly from the outlet-port 12 at the lower side of the casing into the steam-chest. The said valve-casing is also provided with separate right-angularly-related necks 13 and 14, either of which may be employed as an inlet-port for the steam or other motive agent according to which is the most convenient for coupling thereto the steam or motive-agent-supply pipe 15$^a$. As shown in the drawings, the said separate necks 13 and 14 of the governor-valve casing are provided with duplicate outturned fastening-flanges 15, and to the flange 15 of one of said necks is bolted a closing-head 16, while to the flange of the other neck is coupled the said motive-agent-supply pipe 15$^a$. As shown in the drawings, the closing-head 16 is fitted to the neck 14, while the neck 13, opposite the outlet-port 12, has coupled thereto the said motive-agent-supply pipe. These are structural features which are not essential to the successful carrying out of the invention; but to provide for the proper mounting of the balanced governor-valve 1 the casing 2 is provided therein with an interior valve-chamber 17, having the annular holding-flanges 18, inside of which is fitted a cylindrical open-ended valve-seat sleeve 19. The cylindrical open-ended valve-seat sleeve 19 extends longitudinally within the interior valve-chamber 17 and is in free communication with said chamber beyond the holding-flanges 18, as well as with the steam-inlet space in the interval between said flanges. To establish this communication, the valve-seat sleeve is not only open at both ends, but is also provided with a central or intermediate circular series of steam-ports 20 and end series of steam-ports 21 22, arranged between the holding-flanges 18 and the open ends of the sleeve. The interior of the valve-sleeve 19 is finished to provide a smooth and perfect seat for the governor-valve 1, which reciprocates longitudinally within the said valve-seat sleeve, and to provide for properly coöperating with the intermediate and end ports 20, 21, and 22 the said valve consists of a plurality of spaced cut-off disks 23, 24, and 25, respectively, said disks being carried upon a longitudinally-disposed valve-stem 26. This valve-stem 26 slidably works at one end through a guide 27, fitted within one of the open ends of the valve-seat sleeve 19, and the opposite end of the valve is provided with an offset slotted keeper 28, with which is detachably interlocked a coupling-head 29, provided at the inner end of a reciprocatory controlling-stem 30, working through a stuffing-box 31, fitted at one side of the governor-valve casing 2, and also working through a guide 32, fitted in the open end of the valve-seat sleeve 19 opposite the guide 27. The character of the coupling connection 28 29 between the controlling-stem 30 and the governor-valve 1 is not essential, nor are the other details relative to the mounting of parts necessary to a proper working of the governing mechanism, although the construction described has been found to be a practical one.

The controlling-stem 30 constitutes a part of the governing mechanism proper, and its movements are effected by fluid-pressure controllable through the speed of the engine. The end of the said controlling-stem 30, exterior to the governor-valve casing 2, is suitably connected by a fastening 33 to an actuating-piston 34, whose movements are influenced in one direction by fluid-pressure and in the other direction by a weighted controller to be presently referred to. The said actuating-piston may necessarily be of any suitable form and associated with any construction of fluid-pressure receiver; but in order to attain the highest degree of sensitiveness it is preferable to employ an actuating-piston 34 of the flexible diaphragm type. The diaphragm-piston 34 is of the same construction as diaphragms such as are employed in fluid-pressure regulators and other devices providing a piston movement through the medium of a diaphragm, and in the present invention the diaphragm is securely fastened at its edges, as at 35, to the annular flange 36 at one side of the fluid-pressure receiver 37. The diaphragm or actuating piston 34 is arranged so as to constitute one of the walls of the fluid-pressure receiver, and thereby be directly susceptible to the influence of such pressure as may be maintained or created within the receiver 37. In the construction shown the said fluid-pressure receiver 37 is bolted or otherwise rigidly supported, as at 38, at the outer end of a supporting-frame 39 of any suitable construction. This supporting-frame 39 may be conveniently constructed as shown in the drawings, the same consisting of the upper and lower bracket-arms 40 and 41, having flanged terminals respectively for the attachment thereto of the fluid-pressure receiver 37 and for being bolted or otherwise fastened, as at 42, to the side of the governor-valve casing 2, through which the controlling-stem 30 works.

The fluid-pressure receiver 37, which is rigidly supported at the outer end of the frame 39, may be of any suitable size or shape, and while the same may consist of a plain hollow chamber if found desirable it may be provided with an interior dished or concave back wall 43, which constitutes a seat for the piston-diaphragm 34 when the latter bulges inwardly, thus relieving the fastened edges of the diaphragm from strain. To provide for draining the fluid-pressure receiver of accumulation of condensed products or for purposes of cleaning the same, should this ever be necessary, the said receiver is fitted with a drain-cock 44 in communication with the lower portion thereof, and at any suitable point above the drain connection, and preferably at the top portion thereof, the said fluid-pressure receiver 37 has fitted thereto a vent-pipe 45, provided with a manually-controlled pressure-regulating valve 46, the stem 47 of which is equipped with an exterior hand-wheel 48 and also with an indicating-pointer 49, which plays over an indicator-dial 50, graduated to the speed of the engine with reference to the pressure for controlling such speed. Through the medium of the pointer and dial, which constitute a speed-indicator, the valve 46 may be turned to a position for regulating the working pressure which is to be maintained within the fluid-pressure receiver 37 to provide for governing the engine to a normal speed under the varying conditions of the load which may be imposed thereon.

The fluid-pressure receiver 37 is constantly supplied with air or other fluid under pressure through the movement of the engine or motor, and in the preferable construction there is employed a fluid-pressure-supply device 51 in the form of a charging-pump, which is operated directly from one of the moving parts of the engine. This pressure-supplying device or charging-pump is peculiarly constructed in certain respects to provide for supplying the air or fluid under pressure only of a sufficient degree to influence the sensitive actuating-piston 34 in one direction, while at the same time providing a perfectly constant charging or pumping action without the slightest degree of friction or wear. In the preferred construction the pressure-supplying device or charging-pump 51 primarily consists of a working cylinder 52 and a charging-plunger 53, working within and out of the same and having no contact therewith. The parts of the charging-pump may be mounted in any convenient position upon the engine, so as to be operated conveniently from some working part thereof, and one way of mounting the parts is shown in the drawings and consists in detachably supporting the working cylinder or barrel 52 directly upon one of the heads of the engine-cylinder 5. To effect this attachment, the cylinder or barrel 52 of the pump is provided at the inner closed end thereof with a laterally-offset slotted attaching lug or bracket 54, adapted to receive a bolt or other fastening device for rigidly holding the cylinder in place. The slotted lug or bracket also permits of an accurate adjustment of the cylinder in a proper working position before being rigidly clamped in place. With the cylinder or barrel 52 thus clamped in position upon the engine and held stationary thereon the outer open end 55 of the cylinder is free to receive the charging-plunger 53, which is carried at one end of a plunger-rod 56, the other end of which rod is rigidly fastened, as at 57, to a carrying-arm 58, which may be conveniently secured directly to the reciprocating cross-head 7 of the engine, thereby effecting a rigid coupling of the charging-plunger to a moving part of the engine, so that the speed of the same will directly control or influence the charging or pumping action of the pressure-supplying device.

The charging-plunger 53 may be of any suitable construction, provided it is of less diameter than the internal bore of the cylinder 52 and will freely enter and pass out of the open end thereof; but it is preferable to provide an adjustable connection between the said plunger and the end of the rod 56 carrying the same, whereby the plunger may be accurately adjusted or centered with reference to the cylinder should this ever be necessary to maintain the necessary clearance between the plunger and the cylinder. When applying the parts to an engine or other motor apparatus in connection with which the governor may be employed, it may be found necessary to manually adjust the charging-plunger 53 to properly center the same with reference to the cylinder for the purpose stated; but the invention preferably contemplates a connection between the plunger and the rod 56 whereby the plunger may be properly said to be "self-adjustable" or "self-centering." A construction admitting of this self-adjustment of the plunger is shown in detail in Fig. 6 of the drawings and consists in forming the plunger of a head 59, which, as shown, is of a cupped formation. This head 59 is also preferably provided with an exterior beveled periphery 60, which positively insures the free entrance of the plunger under all conditions, even in the event of the parts becoming slightly disalined, and the head 59 is also provided with an enlarged bolt-opening 61, receiving the threaded bolt-stud 65, projecting from the end of the plunger-rod 56 carrying the plunger, said bolt-stud being engaged by the binding-nut 64, which serves to frictionally bind the head 59 between an abutment-collar 63 on the plunger-rod and a washer 66, interposed between the binding-nut 64 and the adjacent side or face of the plunger-head. The large central bolt-opening 61 of the bolt-head is considerably larger than the bolt-stud 65 to permit of lateral movement or adjustment of the head 59. The said head 59 is frictionally held with sufficient firmness between the collar 63 and washer 66 as to be prevented from moving out of position by its own weight, but the same can be moved manually or can adjust itself under conditions that would bring about any disalinement between the plunger and the cylinder. At the same time the plunger-head is under ordinary conditions so adjusted as to provide a proper clearance by not contacting with the walls of the working cylinder or barrel 53.

The details described in connection with the fluid-pressure-supply device 51 may necessarily be changed or modified to suit different conditions; but there are several distinct advantages important to the successful carrying out of the invention accruing from the employment of a charging-plunger having a free clearance from the working cylinder or barrel and involving an entire absence of valves, besides requiring no packing whatever. A packed or valved air-pump would be ineffectual for the purposes of the present invention for the reason that at fast speeds a packed pump would rapidly become leaky, besides creating such a suction as to seriously affect the sensitiveness of the governor. The action of a packed and valved charging-pump could not be constant on account of the friction and wear incident to its operation, and these disadvantages are entirely obviated by the employment of a charging-pump such as described, in which there is no appreciable suction nor any packed working joints.

In the operation of the engine the plunger 53 as it enters the open end of the cylinder or barrel 52 gives impulse to the air in front of the same and forces it under a comparatively gentle and slight compression through the outlet port or nipple 67, communicating with the closed end of the cylinder or barrel and having coupled thereto a pressure-supply pipe 68. This pressure-supply pipe 68 may be conveniently in the form of a hose or tubing and is suitably connected with the fluid-pressure receiver 37, so as to communicate with the air or fluid inlet port 69, provided therein, preferably in the side opposite the flexible wall or diaphragm 34 thereof. At a suitable point in the line of the supply-pipe 68 or at the point of its connection with the fluid-pressure receiver, as shown in the drawings, there is provided a check-valve 70, which prevents backflow from the receiver 37 to hold the air or fluid therein under a working pressure, the only escape being provided through the pressure-regulating valve 46, previously referred to. To provide means for preventing the charging-pump 51 from supplying the air or fluid under too great a pressure, and thereby regulating the pump to the proper working condition, the same may be provided with a pet relief-cock 71, arranged to communicate with the closed end of the working cylinder or valve.

The fluid-pressure devices serve during the activity of the engine to supply the fluid-pressure receiver 37 with air or other fluid under sufficient pressure to tend to move the actuating diaphragm or piston 34 in an outward direction, and this tendency is counteracted or governed by a weighted controller 72, associated with the said actuating diaphragm or piston 34. In the form of the invention where pressure is supplied to the receiver 37 the pressure of the weighted controller 72 is normally under working conditions exerted inwardly upon the diaphragm 34, and while different forms of weighted controllers may be utilized a practical construction consists in having the said controller in the form of a bell-crank weight-lever pivotally supported at its angle, as at 73, on the upper bracket-arm 40 of the supporting-frame 39. In this construction the pendent arm 74 of the bell-crank lever 72 is provided with a slotted portion 75, loosely engaging with a stud or pin 76, carried by the reciprocatory controlling-stem 30 of the governing mechanism, and the upper or horizontally-disposed arm 77 of the bell-crank has fitted thereon a governing-weight 78. This governing-weight is detachably and adjustably fitted on the upper arm 77 of the bell-crank, preferably through the medium of a set-screw 79, and is so arranged and is of such a weight as to properly govern or control the movement of the controlling-stem 30, especially to provide for thrusting the same in a contrary direction to the outward movement of the diaphragm or actuating-piston 34 of the fluid-pressure devices. During the operation of the engine the weighted controller 72 is free to exert its influence upon the controlling-stem 30; but when the engine is not running, and consequently no pressure is supplied to the receiver 37, it is necessary to provide means for holding the parts in a properly-set position, whereby the steam or motive agent may readily pass into the engine when the engineer is ready to start the same. This is accomplished in the present invention through the medium of a setting device 80. This setting device is preferably in the form of a swinging arm pivotally supported at its lower end, as at 81, upon the lower bracket-arm 41 of the supporting-frame and provided at its upper and swinging end with a curved supporting-shoe 82, adapted to be moved under the weight 78, carried by the bell-crank 72, whereby the weighted arm of the bell-crank will be sustained directly upon the setting-arm 80 and held in an elevated position, in which position of the bell-crank the governor-valve 1 will be held wide open, as plainly shown in Fig. 2 of the drawings. The curved supporting-shoe 82 is a mere structural detail of the setting device, but is of advantage by reason of facilitating the swinging end of the setting device or arm being readily drawn under the weight 78 when the parts are being set when the engine has closed down or stopped running.

Figure 1:
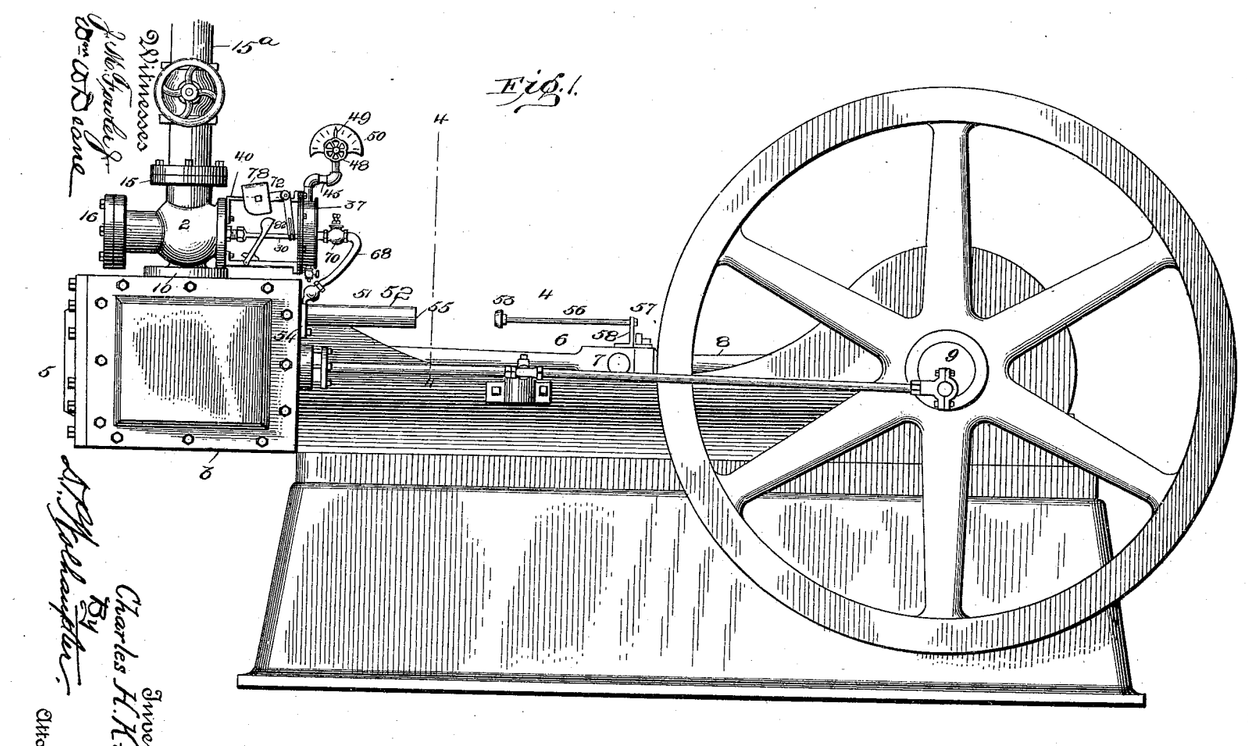
Figure 1 is an elevation of an engine equipped with an automatic fluid-pressure-controlled governor attachment constructed in accordance with the present invention, showing the parts of the governor in operative position while the engine is running.
Figure 2:
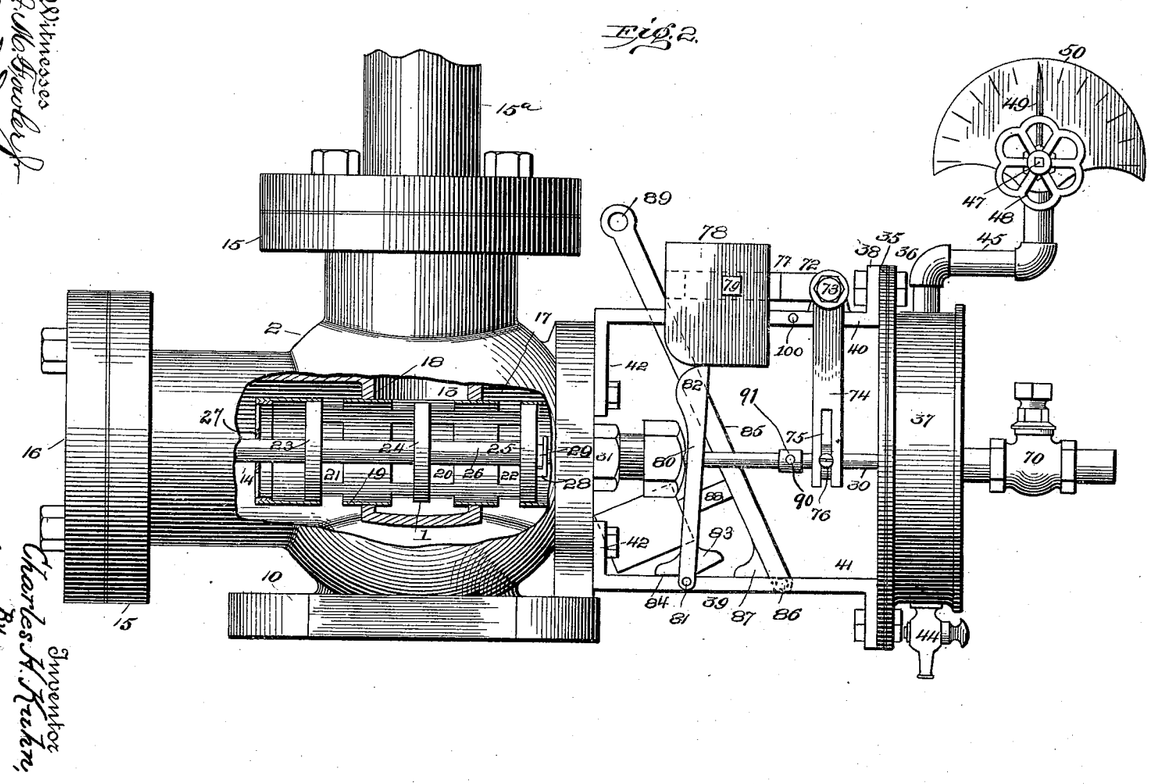
Fig. 2 is an enlarged side elevation of the governor or governing mechanism, omitting the fluid-pressure-supply device and showing the parts set in the position which they occupy when the engine is not running and the supply of steam or other motive agent cut off.
Figure 3:
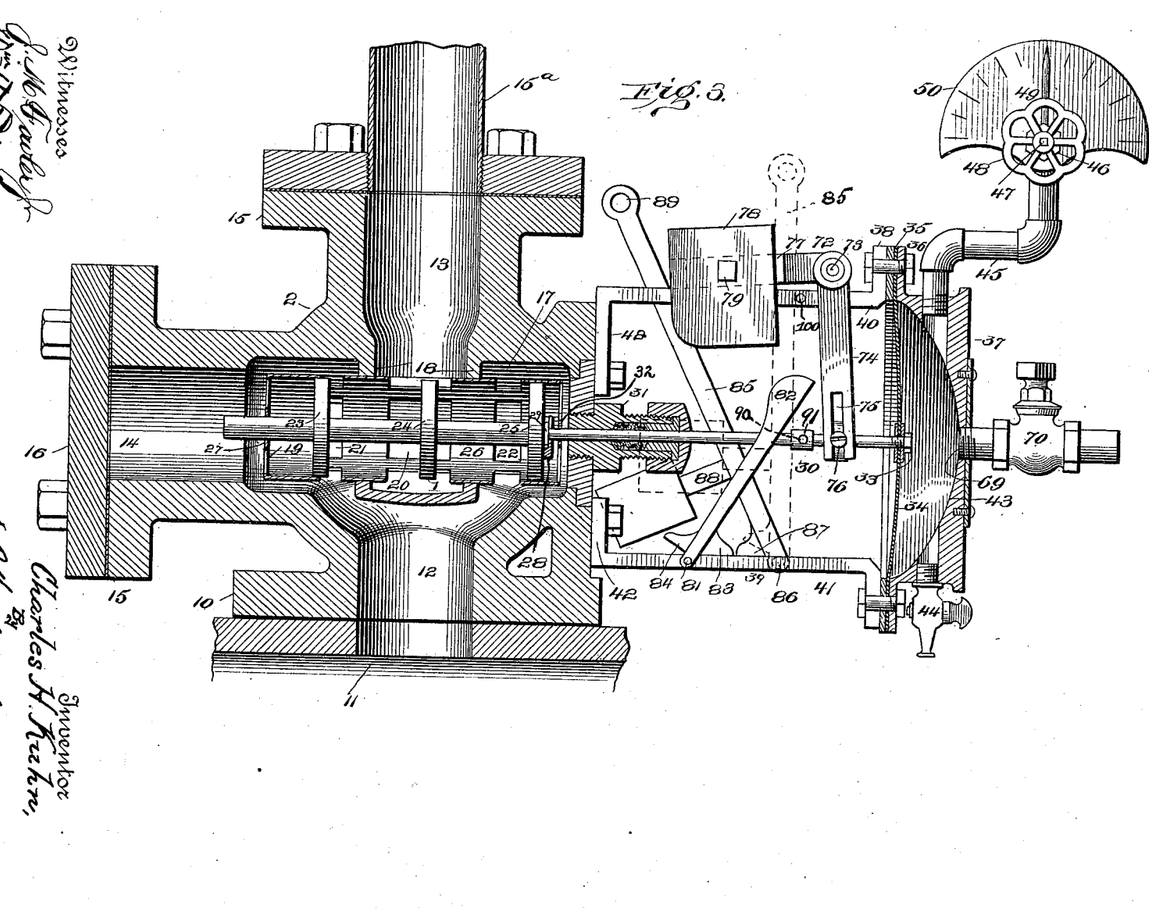
Fig. 3 is an enlarged sectional view of the construction shown in Fig. 2 and illustrating all parts of the mechanism in their working positions.

The swinging setting device or arm 80 is provided, preferably contiguous to the pivoted end thereof, with separate oppositely-located stops 83 and 84, which are adapted to respectively limit the upward and downward movements of the arm. These stops may be provided upon the arm in any practical manner and may be arranged to engage any contiguous or adjacent parts of the frame or governing mechanism; but in the construction shown the stops 83 and 84 are illustrated as being adapted to engage with the bracket 41, on which the arm is pivotally mounted. When moved by hand to its upright position beneath the weighted arm of the bell-crank, as shown in Fig. 2 of the drawings, the stop 84 serves to arrest further movement of the setting-arm toward the governor-valve casing, and when the engine has started and the pressure within the receiver moves the diaphragm or piston 34 outward, thereby raising the weighted bell-crank from the setting-arm 80, the latter will automatically gravitate or swing downwardly in a direction away from the governor-valve casing and out of the way of the bell-crank during the activity of the engine and the governing mechanism. This downward movement of the setting-arm is arrested by the stop 83 engaging the bracket 41, as is plainly shown in Figs. 1 and 2 of the drawings. Assuming that the engine has stopped, and thereby the supply of air under pressure to the receiver 37 has ceased, the weighted controller or bell-crank 72 would move the controlling-stem 30 to the extreme limit of movement in one direction, and thereby entirely close the governor-valve, so as to entirely cut off the passage of steam to the engine, even when the main throttle is opened up. To provide for opening the governor-valve and holding it open under such conditions, the setting device or arm 80 is brought into play in the manner described, and thereby serves to hold the parts in a set condition ready for operation immediately after the turning of the steam or other motive agent into the engine. When the engine starts up and the pressure of air or other fluid within the receiver 37 acts upon the diaphragm 34, the weight 78 will be raised, as described, to permit the setting-arm to fall out of the way, and thus bring the weighted controller or bell-crank completely into play. The automatic falling of the setting-arm may be provided for by overweighting the falling side of the arm or by so mounting the arm that it will not assume a truly vertical position when set under the weight. When the engine is running and pressure supplied to the receiver 37, the conjoint action of the diaphragm or piston 34 under the influence of the pressure from the air and the weighted controller or bell-crank 72 will serve to actuate the controlling-stem 30 strictly in accord with the speed of the engine, thus keeping the cut-off disks 23, 24, and 25 playing over the steam-ports 20, 21, and 22 in the valve-seat in order to at all times give a proper steam-opening, and thus control the engine at the proper speed according to the load imposed thereon. It will be observed that the valve 21 is perfectly balanced, inasmuch as the same is freely exposed to an equal pressure of steam or motive agent upon both sides of all of the cut-off disks thereof, and inasmuch as all of said disks move in unison and serve to simultaneously contract or open up the steam-ports with which they are respectively associated the supply of steam or motive agent is placed completely under the control of the governing mechanism, thus insuring the closest possible regulation. Also by reason of the construction described in the event of a sudden stoppage or breakage of the engine, thereby cutting off the pressure-supply, the weighted bell-crank will instantly throw the valve to an extreme limit in one direction to cut off entirely the supply of steam to the engine. In the other extreme—namely, a "racing" of the engine—the abnormal pressure which will necessarily be created in the fluid-pressure receiver will throw the valve to its limit of movement in the opposite direction and also effect an immediate cut off of the same.

The herein-described governing mechanism is so constructed as to permit of the use in connection therewith of a sawyer's lever 85, which lever may be conveniently pivoted, as at 86, at one end thereof upon the lower bracket-arm 41 of the supporting-frame. The said lever is provided contiguous to its pivotal support with a stop projection 87 for engagement with the supporting-frame or other adjacent object to prevent the same from falling too far in one direction, and at an intermediate point between its ends the said lever is provided with a laterally-extending weighted arm 88, which serves to normally swing the same in the direction in which it is limited by the stop 87. The swinging or upper end of the sawyer's lever is provided with an eye 89 or is otherwise constructed for attachment thereto of an operating rope or cable leading to the sawyer in order that the governor-valve 1 may be placed under his immediate control. When it is desired to bring the sawyer's lever into use, it is simply necessary for the sawyer to draw upon the operating rope or cable connected with said lever, thereby causing the same to swing in a direction toward the piston-diaphragm and against a tappet projection or pin 90, which may be conveniently carried by a collar 91, fitted to the controlling-stem 30. When the sawyer's lever is drawn against the tappet projection or pin 90, which may be said to be carried by the controlling-stem, the latter will be thrust in a direction for throwing the valve wide open entirely independent of the weighted controller 72 and the piston-diaphragm 34. In order to positively arrest further movement of the sawyer's lever when it reaches the extreme point to which it is to be drawn for the purposes of opening the valve fully, a suitable stop or stop projection 100 may be conveniently arranged upon the upper bracket-arm 40 of the frame 39. By reason of the employment of the stop or stop projection 100 the sawyer's lever is not only limited in its play to provide for holding the valve at the wide-open position, but at the same time the said stop prevents a racking or jarring of the machine by the strong or sharp pull made by the sawyer with the operating rope or cable. When the sawyer releases his pull upon the operating rope or cable, the weighted arm 88 automatically carries the sawyer's lever to an inactive position disconnected from the governor mechanism proper, so as not to interfere at all with the general operation thereof. When the log-carriage of the sawyer is carried forward, the engine is under the control of the governing mechanism; but by bringing the sawyer's lever into use the sawyer may throw the valve quickly wide open to provide for the quick return of the carriage.

Figures 4, 5, 6, 7:
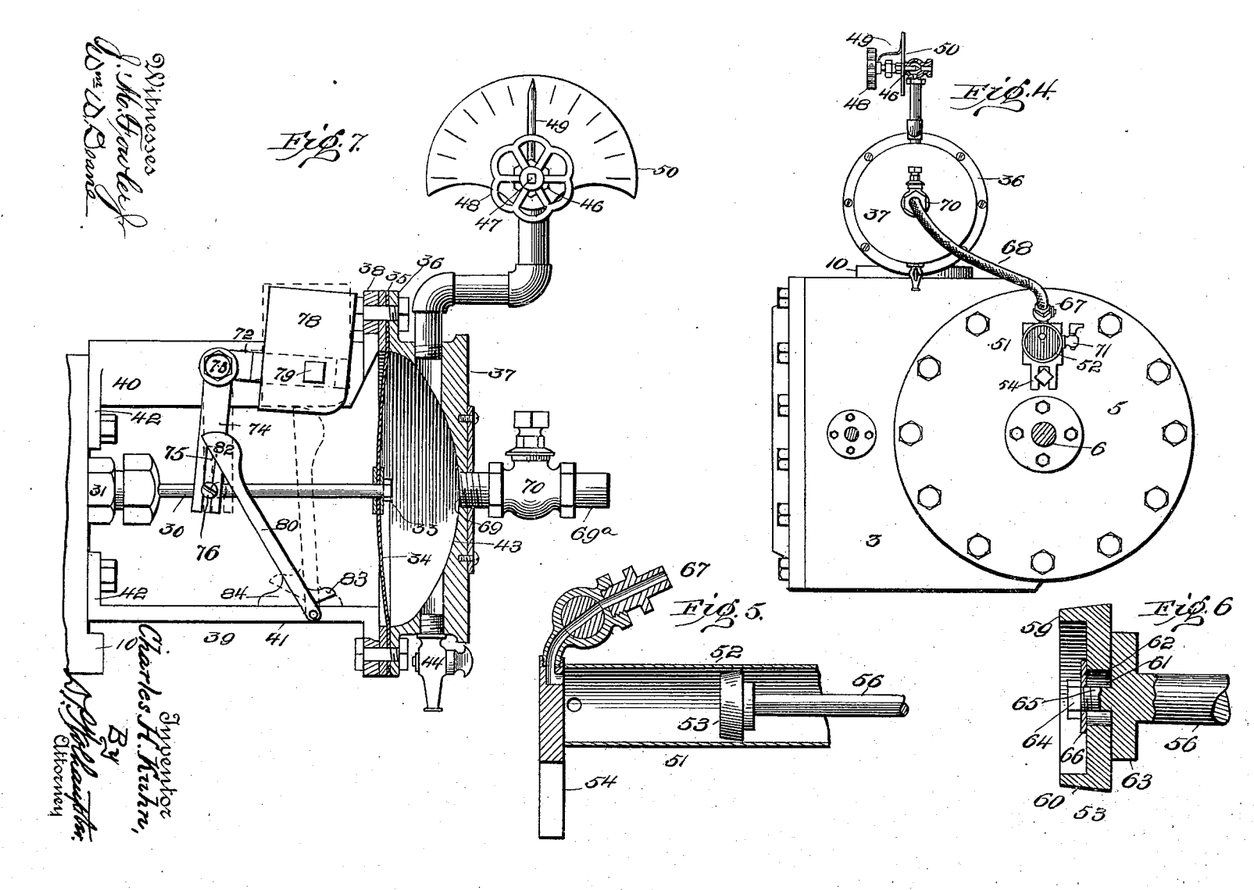
Fig. 4 is a cross-sectional view on the line 4 4 of Fig. 1, illustrating one of the preferred ways of mounting the fluid-pressure-controlling devices and the fluid-pressure-supplying device with relation to the cylinder and steam-chest of the engine.
Fig. 5 is an enlarged longitudinal sectional view of the fluid-pressure-supplying device, including the pump-cylinder and the charging-plunger.
Fig. 6 is an enlarged detailed sectional view of the construction of charging-plunger which may be employed in the carrying out of the invention.
Fig. 7 is an elevation, partly in section, of a modification of the invention in which the reverse principle is employed—namely, the maintenance of a vacuum and the utilization of atmospheric pressure to effect the movement of the actuating-piston or diaphragm, the view showing in full lines the working positions of the parts and in dotted lines their set positions as held by the setting device.

Various modifications of the invention may be resorted to without departing from the principle involved, and one obvious modification is disclosed in Fig. 7 of the drawings and consists in reversing the parts in order that the operation may be carried out by maintaining a vacuum in the receiver 37, which would then act in the capacity of a vacuum-chamber, the degree of rarefication within said chamber being controllable through the medium of the regulating-valve 46, which would therefore serve a function similar to the valve when used as a pressure-regulator, as previously described. In this modification of the invention any suitable exhausting device or pump operated from the engine in any suitable manner could be utilized in connection with the suction-pipe 69ª, and during the running of the engine the speed thereof would control the degree of rarefication within the vacuum-chamber 37, and thus permit the atmospheric pressure exterior to said chamber to exert its influence in an inward direction upon the diaphragm or actuating-piston 34, thus controlling the movement of the governor-valve in one direction by atmospheric pressure and in an opposite direction by the same weighted controller previously described. As stated, no substantial change is involved in this modification excepting the employment of an exhausting device or pump and the reverse mounting of the weighted controller 72 and the setting device 80.

It will be understood from the foregoing description that the governing mechanism is not only applicable to engines of various kinds, but also to all types of motors, including pumps, for the reason that the operation of the governing mechanism does not depend upon the belts or gearing, such as the ordinary type of governors. Also it should be observed that the governor or governing mechanism contemplated by the present invention allows the engine or motor upon which it is used to be reversed while the governor is still acting, regardless of the manner in which the machinery may be run. For example, oil-well engines cannot be run with the present style of governors, because the engine cannot be reversed with the governor upon it, and in drilling and operating oil-wells the engine has to be reversed many times a day. Therefore engines used for that purpose are not ordinarily provided with governors at all. The present invention is therefore very useful in connection with oil-well engines, inasmuch as the engine can be reversed at will without interfering with the operation of the governor.

Other modifications will suggest themselves to those skilled in the art, and it will be understood that various changes in the size, shape, proportion, and minor details of construction may be resorted to without departing from the spirit or sacrificing any of the advantages of the invention.

Having thus described the invention, what is claimed, and desired to be secured by Letters Patent, is—

1. In a governor for engines, the governor-valve having a controlling-stem, fluid-pressure actuating means including a receiver and an actuating-piston having a direct connection with said stem, and a weighted controller also having a direct connection with the same stem and opposed in its influence to that of the piston.

2. In a governor for engines, the governor-valve having a controlling-stem, fluid-pressure actuating means for moving the stem in one direction, a separate controller opposed to the fluid-pressure actuating means, and separate means, independent of said actuating means, for holding the parts in a fixed position with the governor-valve open.

3. In a governor for engines, the governor-valve having a controlling-stem, fluid-pressure actuating means for moving the stem in one direction, a separate controller opposed to the fluid-pressure actuating means, and means, releasable automatically, and adapted for setting the parts in a fixed position with the governor-valve open.

4. In a governor for engines, the governor-valve, fluid-pressure actuating means having an operative connection with the valve, and a fluid-pressure-supply device actuated from a moving part of the engine, said fluid-pressure-supply device being provided with working elements having clearance in operation.

5. In a governor for engines, the governor-valve, fluid-pressure actuating means having an operative connection with the valve, and a fluid-pressure-supply device actuated from a moving part of the engine and comprising a relatively fixed and movable cylinder and plunger having a clearance of each other.

6. In a governor for engines, the governor-valve, fluid-pressure actuating means having an operative connection with the valve and a fluid-pressure-supply device, operated from a moving part of the engine and comprising a fixed open-ended cylinder and a plunger arranged to move within and out of the cylinder.

7. In a governor for engines, the governor-valve, fluid-pressure actuating means having an operative connection with the valve, and a fluid-pressure-supply device comprising a fixed cylinder open at one end and a movable plunger carried with a moving part of the engine and arranged to move within and out of the cylinder, said plunger being of less diameter than the cylinder to have a clearance from the same.

8. In a governor for engines, the governor-valve, fluid-pressure actuating means for the valve, and a fluid-pressure-supply device operated from a moving part of the engine and comprising a relatively fixed cylinder and plunger, the plunger having a clearance from the cylinder and provided with an adjustable support to permit of centering with relation to the cylinder.

9. In a governor for engines, the governor-valve, fluid-pressure actuating means, including an actuating-piston having a stem connection with the valve, a separate controller opposed to the fluid-pressure actuating means, and a fluid-pressure-supply device operated from a moving part of the engine and comprising working elements having clearance in operation.

10. In a governor for engines, the governor-valve, fluid-pressure actuating means including a receiver and a flexible diaphragm having a stem connection with the valve, a separate controller opposed to the fluid-pressure actuating means, and a fluid-pressure-supply device operated from a moving part of the engine and comprising working elements having clearance in operation.

11. In a governor for engines, the governor-valve, fluid-pressure actuating means including a receiver and an actuating-piston having a stem connection with the valve, a separate controller opposed to the fluid-pressure actuating means, a fluid-pressure-supply device, and a pressure-regulator connected with the receiver and having manually-controlled speed-indicating means.

12. In a governor for engines, the governor-valve, fluid-pressure actuating means including a receiver and a flexible diaphragm having a stem connection with the valve, a weighted controller opposed to the fluid-pressure actuating means, a fluid-pressure-supply device, and a pressure-regulator connected with the receiver and comprising the manually-operated valve and speed-indicating means exterior thereto.

13. In a governor for engines, the governor-valve, fluid-pressure actuating means including a receiver and an actuating-piston having a stem connection with the valve, and a weighted controlling-lever connected with the stem and opposed to said piston.

14. In a governor for engines, the governor-valve, fluid-pressure actuating means including a receiver and an actuating-piston having a stem connection with the valve, and a bell-crank weight-lever having a pivotal connection with the stem and opposed to said actuating-piston.

15. In a governor for engines, the governor-valve, a suitable support, a fluid-pressure receiver carried by such support and provided with an actuating-piston, a controlling-stem connecting said piston with the governor-valve, and a bell-crank weight-lever also carried by said support and connected with said stem.

16. In a governor for engines, the governor-valve, fluid-pressure actuating means including a receiver and an actuating-piston having a stem connection with the valve, a weighted controlling-lever connected with the stem and opposed to said piston, and a setting device arranged to sustain the lever in an inactive set position, and automatically released by the action of the said fluid-pressure actuating means.

17. In a governor for engines, the governor-valve, fluid-pressure actuating means including a receiver and an actuating-piston having a stem connection with the valve, a weighted bell-crank lever having one arm connected with said stem, and an automatically-released setting-arm having a pivotal support and arranged to be drawn beneath the weighted portion of said bell-crank lever, said setting-arm being provided with stops for limiting its movement in both directions.

18. In a governor for engines, a reciprocatory balanced governor-valve, fluid-pressure actuating means including an actuating-piston having a stem connection with the valve, a weighted controller coöperating with the stem, and a fluid-pressure-supply device operated from a moving part of the engine.

19. In a governor for engines, the combination with the governing mechanism, of the governor-valve casing having an interior valve-chamber, a separate cylindrical open-ended valve-seat sleeve fitted in said chamber and having intermediate and end series of ports, said sleeve also having guides at the ends thereof, and a reciprocatory valve coupled to the governing mechanism and comprising a plurality of spaced cut-off disks sliding within the said sleeve, and stem portions working in the guides of the sleeve.

20. In a governor for engines, the combination with the governing mechanism including a reciprocatory valve and a controlling-stem therefor, said stem carrying a tappet projection, of a sawyer's lever normally disconnected from the controlling-stem and supported in a plane for being manually and temporarily drawn against said tappet projection.

21. In a governor for engines, the combination with the governing mechanism including a reciprocatory valve and a controlling-stem therefor, said stem carrying a tappet projection, of a swinging pivotally-supported sawyer's lever weighted at one side and normally lying in an inactive position disconnected from the stem, said lever being arranged in a plane for being manually and temporarily drawn against said tappet projection.

22. In a governor for engines, the governor-valve, fluid-pressure actuating means for the valve, and a pressure-supply device comprising a cylinder and a plunger, the plunger having a self-adjusting head, said plunger being arranged to move within and out of the cylinder.

23. In a governor for engines, the governor-valve, fluid-pressure actuating means for the valve, and a pressure-supply device comprising a cylinder and a plunger, the plunger having a frictionally-supported self-adjusting head, said plunger being arranged to move within and out of the cylinder.

In testimony whereof I affix my signature in presence of two witnesses.

CHARLES H. KUHN.

Witnesses:
R. H. MELOY,
J. W. MURRAY.